United States Patent
Nakanishi

(10) Patent No.: US 8,948,915 B2
(45) Date of Patent: Feb. 3, 2015

(54) PARALLEL LINK ROBOT, PARALLEL LINK ROBOT SYSTEM, AND METHOD OF CONTROLLING PARALLEL LINK ROBOT

(75) Inventor: Mitsuaki Nakanishi, Fukuoka (JP)

(73) Assignee: Kabushiki Kaisha Yaskawa Denki, Kitakyushu-Shi (JP)

( * ) Notice: Subject to any disclaimer, the term of this patent is extended or adjusted under 35 U.S.C. 154(b) by 268 days.

(21) Appl. No.: 13/602,202

(22) Filed: Sep. 3, 2012

(65) Prior Publication Data
US 2013/0060381 A1    Mar. 7, 2013

(30) Foreign Application Priority Data
Sep. 6, 2011 (JP) .................... P. 2011-194351

(51) Int. Cl.
B25J 9/00 (2006.01)
B25J 13/00 (2006.01)
B25J 9/16 (2006.01)
B25J 17/02 (2006.01)
B25J 9/10 (2006.01)

(52) U.S. Cl.
CPC ............ B25J 9/1623 (2013.01); B25J 17/0266 (2013.01); B25J 9/0051 (2013.01); B25J 17/0283 (2013.01); B25J 17/0275 (2013.01); B25J 9/108 (2013.01); B25J 9/1674 (2013.01); G05B 2219/37214 (2013.01); G05B 2219/42311 (2013.01)
USPC .......................................... 700/258; 700/261

(58) Field of Classification Search
CPC .. B25J 17/0266; B25J 9/0051; B25J 17/0283; B25J 19/06; B25J 17/0275; B25J 9/108; B25J 9/1623
USPC ........... 70/250, 251, 254, 255, 258, 260, 261, 70/262; 901/11, 14, 17, 18, 48, 49
See application file for complete search history.

(56) References Cited

U.S. PATENT DOCUMENTS

| | | | |
|---|---|---|---|
| 6,419,211 B1 * | 7/2002 | Hvittfeldt et al. | 267/69 |
| 7,395,136 B2 * | 7/2008 | Osten | 700/258 |
| 8,109,171 B2 * | 2/2012 | Nakao et al. | 74/490.03 |
| 8,132,481 B2 * | 3/2012 | Nishida et al. | 74/490.01 |
| 8,181,551 B2 * | 5/2012 | Breu et al. | 74/490.01 |
| 2009/0255363 A1 * | 10/2009 | Nishida et al. | 74/490.07 |
| 2009/0255364 A1 * | 10/2009 | Nishida et al. | 74/490.07 |
| 2010/0037721 A1 * | 2/2010 | Nakao et al. | 74/490.05 |
| 2011/0097184 A1 * | 4/2011 | Kinoshita et al. | 414/589 |

FOREIGN PATENT DOCUMENTS

| | | |
|---|---|---|
| CN | 101554727 | 10/2009 |
| JP | 2007-301680 | 11/2007 |
| JP | 2009-248289 | 10/2009 |

OTHER PUBLICATIONS

Japanese Office Action for corresponding JP Application No. 2011-194351, Jul. 30, 2013.
Chinese Office Action for corresponding CN Application No. 201210295796.9, Jun. 19, 2014.

* cited by examiner

*Primary Examiner* — Jason Holloway
(74) *Attorney, Agent, or Firm* — Mori & Ward, LLP

(57) ABSTRACT

A parallel link robot includes a base, three servo motors disposed in the base, three arms, and a robot controller. Each of the three arms includes a first link and a second link that respectively include a first joint and a second joint. Each of the three arms is driven by a corresponding one of the three servo motors. The robot controller determines whether or not any of the first and second joints of the arms is dislocated on the basis of the torques of the three servo motors.

14 Claims, 11 Drawing Sheets

PARALLEL LINK ROBOT, PARALLEL LINK ROBOT SYSTEM, AND METHOD OF CONTROLLING PARALLEL LINK ROBOT

CROSS REFERENCES TO RELATED APPLICATIONS

The present disclosure contains subject matter related to that disclosed in Japanese Priority Patent Application JP 2011-194351 filed in the Japan Patent Office on Sep. 6, 2011, the entire contents of which are hereby incorporated by reference.

BACKGROUND OF THE INVENTION

1. Field of the Invention

The present invention relates to a parallel link robot, a parallel link robot system, and a method of controlling a parallel link robot.

2. Description of the Related Art

There are existing parallel link robots having a plurality of parallelly disposed arms that cooperatively move an end effector. There are also existing parallel link robots that can detect dislocation of a joint of an arm (see, for example, Japanese Unexamined Patent Application Publication No. 2009-248289).

Japanese Unexamined Patent Application Publication No. 2009-248289 discloses a parallel mechanism (parallel link robot) that includes a plurality of electric motors (drive sources) and a plurality of arms respectively driven by the plurality of electric motors. Each arm of the parallel mechanism includes first and second links that are connected to each other through a ball joint (joint portion). The ball joint includes a spherical head, a socket that holds the spherical head, and a conductor that electrically connects the spherical head and the socket to each other. The parallel mechanism disclosed in Japanese Unexamined Patent Application Publication No. 2009-248289 determines whether or not the ball joint (joint portion) is dislocated on the basis of the continuity of the conductor disposed between the spherical head and the socket.

However, the parallel mechanism (parallel link robot) disclosed in the Japanese Unexamined Patent Application Publication No. 2009-248289, with which dislocation of the ball joint (joint portion) can be detected on the basis of the continuity of the conductor of the ball joint (joint portion), has a problem in that the structure of the ball joint (joint portion) becomes complex because the conductor, which electrically connects the spherical head and the socket to each other, is disposed between the spherical head and the socket.

SUMMARY OF THE INVENTION

According to a first aspect of the present disclosure, a parallel link robot includes a base, a plurality of drive sources disposed in the base, and a plurality of arms, and a dislocation detector. Each of the plurality of arms includes a link including a joint. Each of the plurality of arms is driven by a corresponding one of the plurality of drive sources. The dislocation detector determines whether or not any of the joints of the arms is dislocated on the basis of a driving force of at least one of the plurality of drive sources.

According to a second aspect of the present disclosure, a parallel link robot system includes a parallel link robot including a base, a plurality of drive sources disposed in the base, a plurality of arms, and a robot controller. Each of the plurality of arms includes a link including a joint. Each of the plurality of arms is driven by a corresponding one of the plurality of drive sources. The robot controller controls motion of the parallel link robot. The robot controller determines whether or not the joint of the arm is dislocated on the basis of a driving force of at least one of the plurality of drive sources.

According to a third aspect of the present disclosure, a method of controlling a parallel link robot is provided. The parallel link robot includes a base, a plurality of drive sources disposed in the base, and a plurality of arms that each includes a link including a joint, each of the plurality of arms being driven by a corresponding one of the plurality of drive sources. The method includes determining whether or not the joint the arm is dislocated on the basis of a driving force of at least one of the plurality of drive sources.

DESCRIPTION OF THE EMBODIMENTS

Hereinafter, an embodiment will be described with reference to the drawings.

Figure 1:
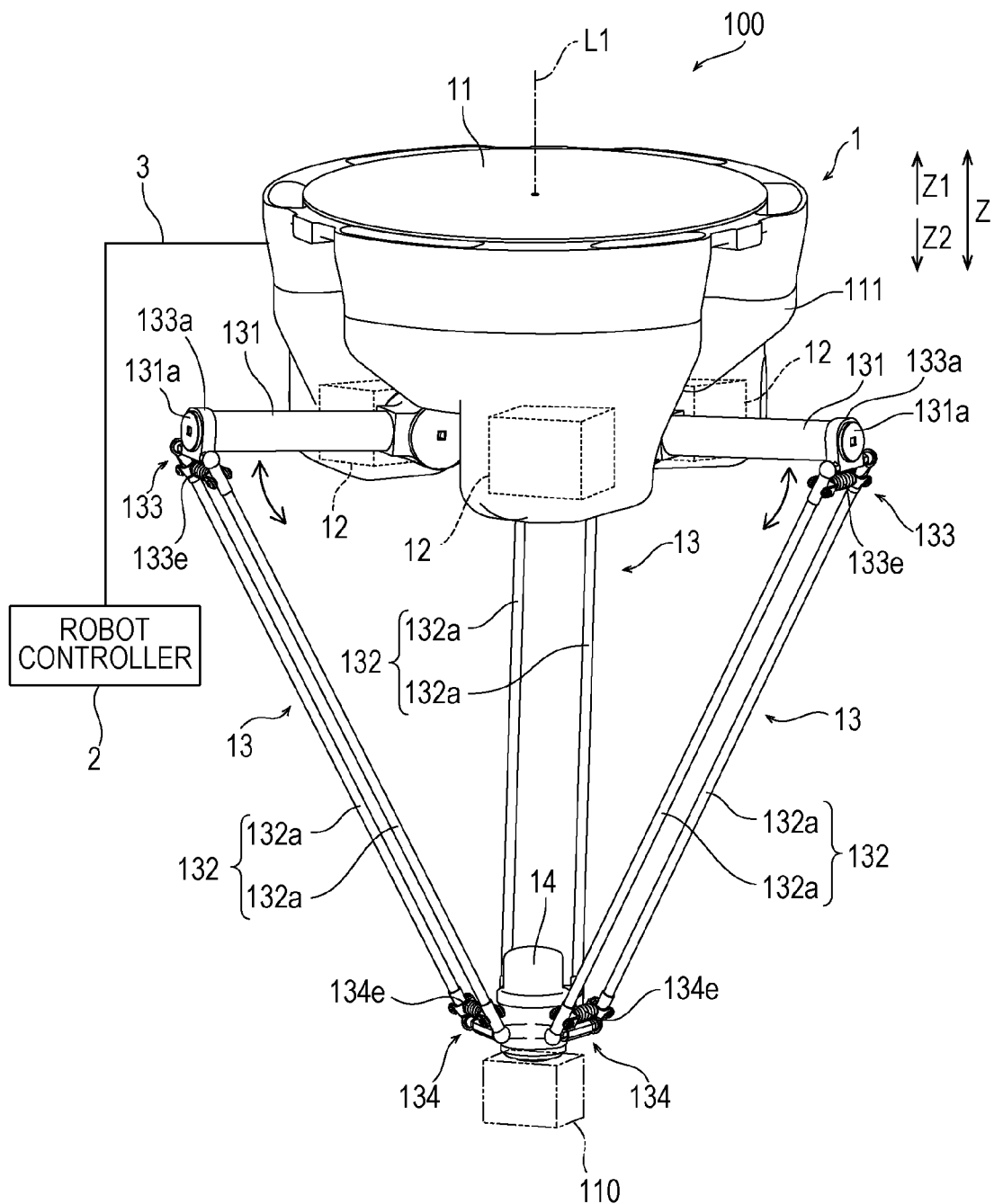
FIG. 1 is a schematic view illustrating the overall structure of a parallel link robot according to an embodiment.
Figure 2:
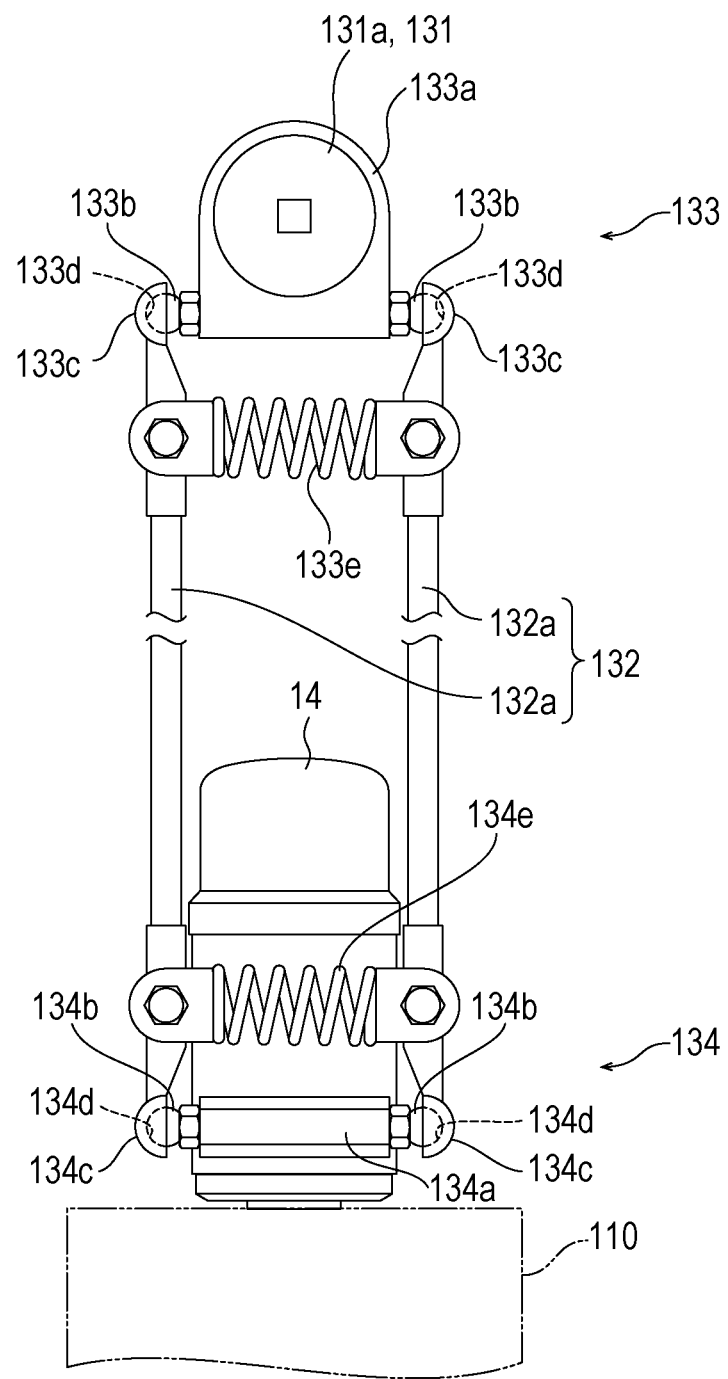
FIG. 2 is a schematic view illustrating the structure of joints of the parallel link robot according to the embodiment.

Referring to FIGS. 1 and 2, the structure of a parallel link robot 100 according to the embodiment will be described.

As illustrated in FIG. 1, the parallel link robot 100 according to the present embodiment includes a robot body 1 and a robot controller 2 that controls the robot body 1. The parallel link robot 100 has a function of moving a predetermined end effector 110 that is attached to the robot body 1 to any position. Moreover, the parallel link robot 100 has a dislocation detection function of determining whether or not at least one of first and second joints 133 and 134 (see FIGS. 1 and 2) of the robot body 1 is dislocated. The details of the dislocation detection function will be described below.

The robot body 1 includes a base 11, three servo motors 12 disposed in the base 11, three arms 13 respectively driven by the three servo motors 12, and a head 14 to which the end effector 110 is attached. Each of the servo motors 12 is an example of a "drive source" according to the present disclosure.

The base 11 is attached to a fixed surface such as a ceiling. The base 11 includes a cover 111, and the three servo motors 12 are disposed inside the cover 111. In plan view, the three servo motors 12 are disposed at equal angles (120 degrees) around a central axis L1 of the base 11 extending in the vertical direction.

The three arms 13 have the same structure. To be specific, each arm 13 includes a first link 131 and a second link 132 that is connected to the first link 131. One end of the first link 131 is attached to an output shaft of the servo motor 12, and the first link 131 can be swung (rotated) by the servo motor 12 in the up-down directions (Z directions) in a vertical plane. The second link 132 includes a pair of poles 132a that extend parallel to each other. A first end of the second link 132 is connected to an end 131a of the first link 131 through the first joint 133. A second end of the second link 132 is connected to the head 14 through the second joint 134. The first link 131 and the second link 132 are examples of a "link" according to the present disclosure. The first joint 133 and the second joint 134 are examples of a "joint" according to the present disclosure.

As illustrated in FIGS. 1 and 2, the first joint 133 and the second joint 134 each have a ball-joint structure. To be specific, as illustrated in FIG. 2, a pair of ball portions 133b are fixed to the end 131a of the first link 131 through a bracket 133a. The pair of ball portions 133b protrude from both sides of the bracket 133a. A pair of sockets 133c are fixed to first ends (the ends near the first link 131) of the pair of poles 132a of the second link 132. The pair of sockets 133c have semispherical recesses 133d into which the ball portions 133b are inserted so as to be in contact with the recesses 133d. The pair of sockets 133c are disposed with the pair of ball portions 133b interposed therebetween, and the pair of sockets 133c and the pair of ball portions 133b are slidable (rotatable) relative to each other. An extension coil spring 133e is disposed near the first ends of the pair of poles 132a. The extension coil spring 133e urges the pair of poles 132a in directions in which the pair of poles 132a may become closer to each other. Thus, the pair of sockets 133c can stably hold the pair of ball portions 133b in a state in which the pair of sockets 133c are pressed against the pair of ball portions 133b from the outside. With such a structure, the first joint 133 connects the first link 131 to the second link 132 so that the first and second links 131 and 132 can bend and stretch.

The second joint 134 has a structure similar to that of the first joint 133. To be specific, a pair of ball portions 134b are fixed to the head 14 through an attachment member 134a. The pair of ball portions 134b protrude outward from both ends of the attachment member 134a. A pair of sockets 134c are fixed to second ends (ends near the head 14) of the pair of poles 132a of the second link 132. The pair of sockets 134c have semispherical recesses 134d into which the ball portions 134b are inserted so as to be slidably in contact with the recesses 134d. An extension coil spring 134e is disposed near the second ends of the pair of poles 132a. The extension coil spring 134e urges the pair of poles 132a in directions in which the pair of poles 132a may become closer to each other. The ball portions 134b, the sockets 134c, the recesses 134d, and the extension coil spring 134e of the second joint 134 respectively correspond to the ball portions 133b, the sockets 133c, the recesses 133d, and the extension coil spring 133e of the first joint 133.

Figure 4:
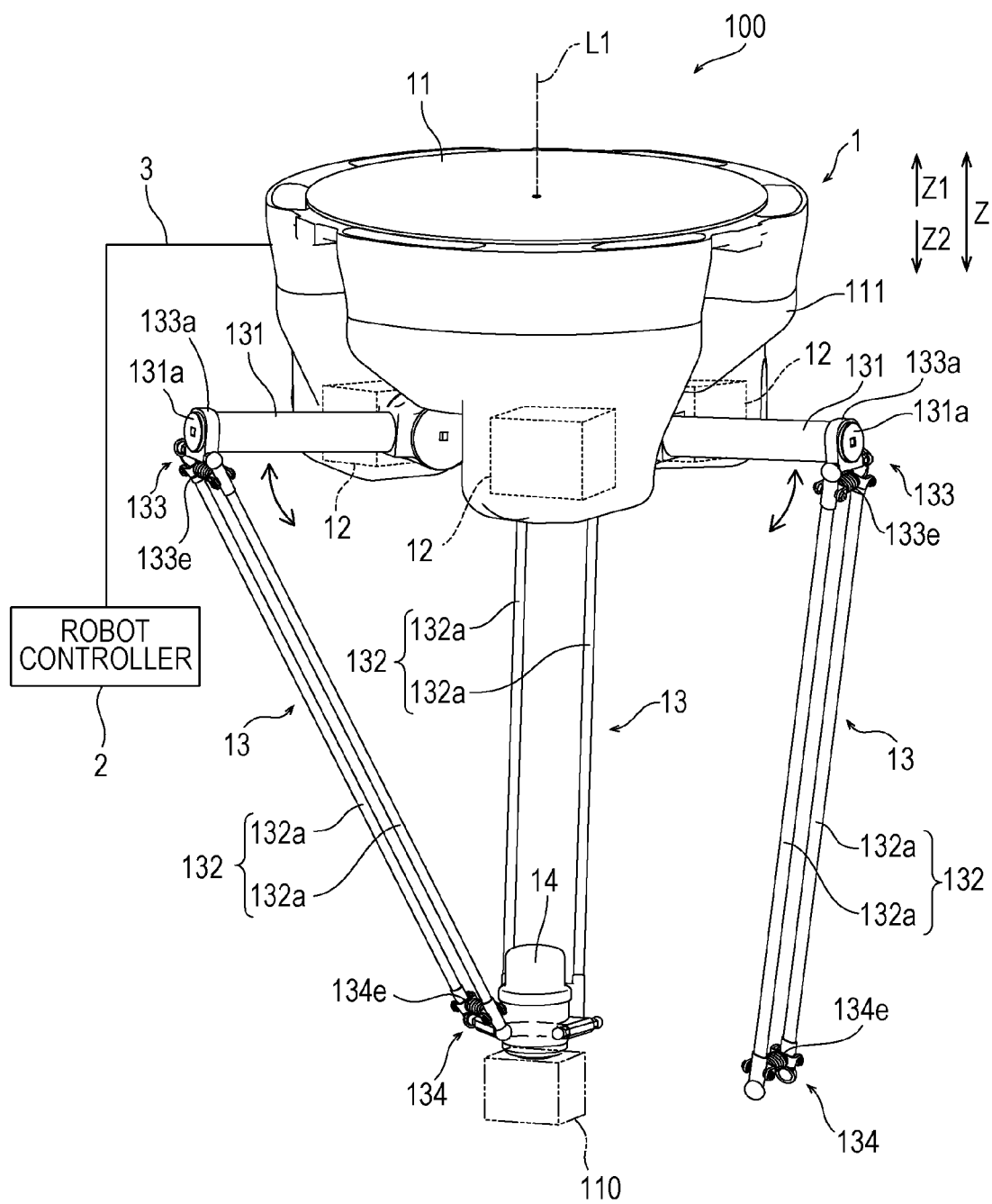
FIG. 4 is a schematic view illustrating a state in which one of the joints of the parallel link robot according to the embodiment is dislocated.

The first joint 133 (the second joint 134) having the structure described above may become dislocated during operation of the robot body 1 because the sockets 133c (134c) may drop off the ball portions 133b (134b) if an excessive load is applied to the extension coil spring 133e (134e) or because the ball portions 133b (134b) or the sockets 133c (134c) may become deformed due to deterioration over time. FIG. 4 illustrates a state in which one of the second joints 134 is dislocated.

Figure 5:
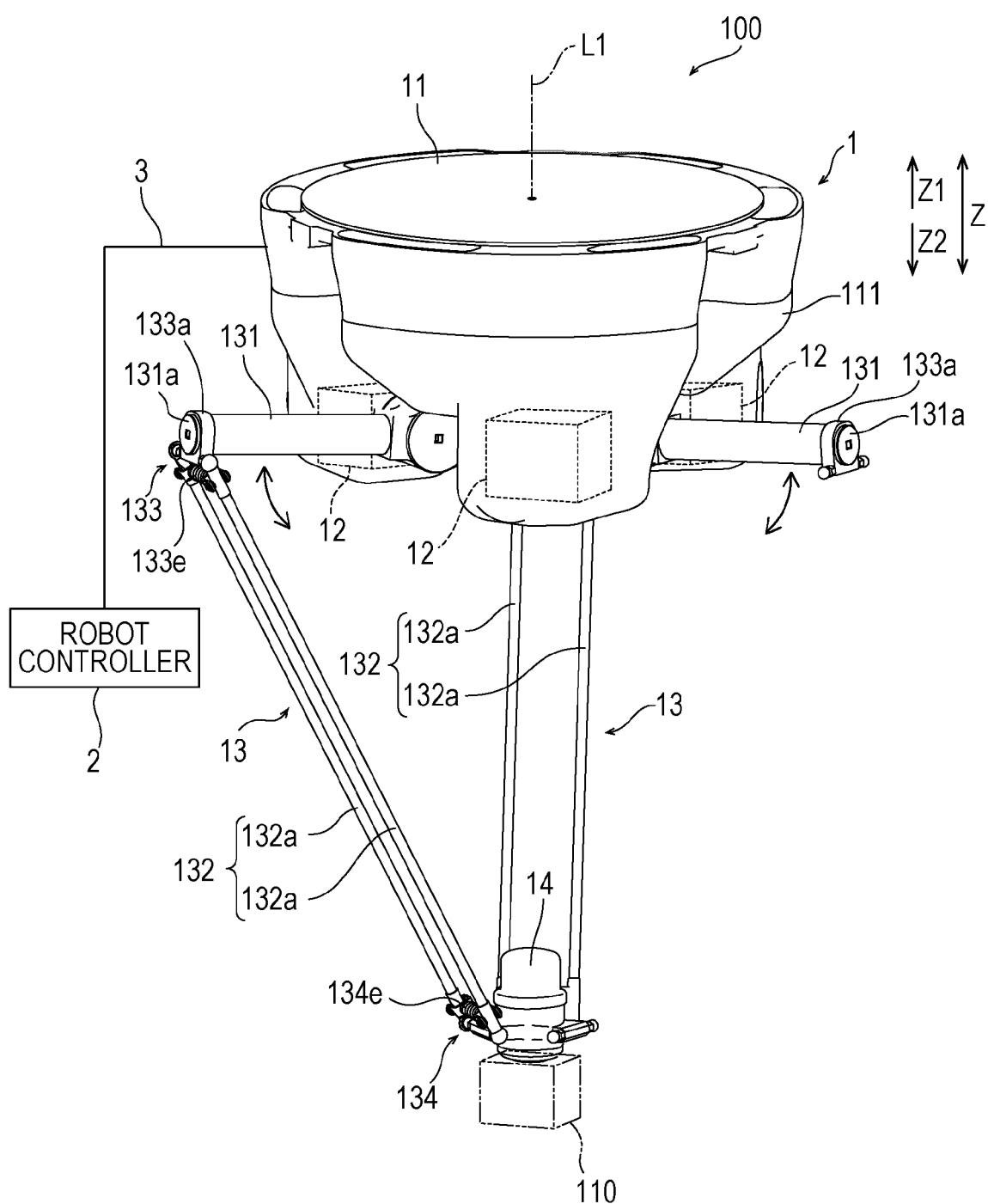
FIG. 5 is a schematic view illustrating a state in which both of the joints of the parallel link robot according to the embodiment are dislocated.

Moreover, with the structure described above, if one of the first joint 133 and the second joint 134 is dislocated, the second link 132 dangles from other joint that is not dislocated. If the dangling second link 132 swings when the robot body 1 moves, the other joint may become dislocated due to the momentum of the swing. FIG. 5 illustrates a state in which the first joint 133 has dislocated subsequent to the state illustrated in FIG. 4 and the second link 132 has dropped off.

The head 14 is supported by the three arms 13. The head 14 can have any orientation at any position in accordance with the combination of the orientations of the three arms 13. Thus, the end effector 110 attached to the head 14 can take any orientation at any position.

As illustrated in FIG. 1, the robot controller 2 is communicatively connected to the robot body 1 through a robot control cable 3. The robot controller 2 outputs motion commands to the servo motors 12 in the robot body 1 and thereby controls the motion of the robot body 1. The robot controller 2 can determine whether or not dislocation has occurred in each of the three sets of the first joints 133 and the second joints 134 on the basis of the torques of the three servo motors 12. A user can selectively enable or disable the dislocation detection function of the robot controller 2. The robot controller 2 is an example of a "dislocation detector" according to the present disclosure. The torque is an example of a "driving force" according to the present disclosure.

Figure 3:
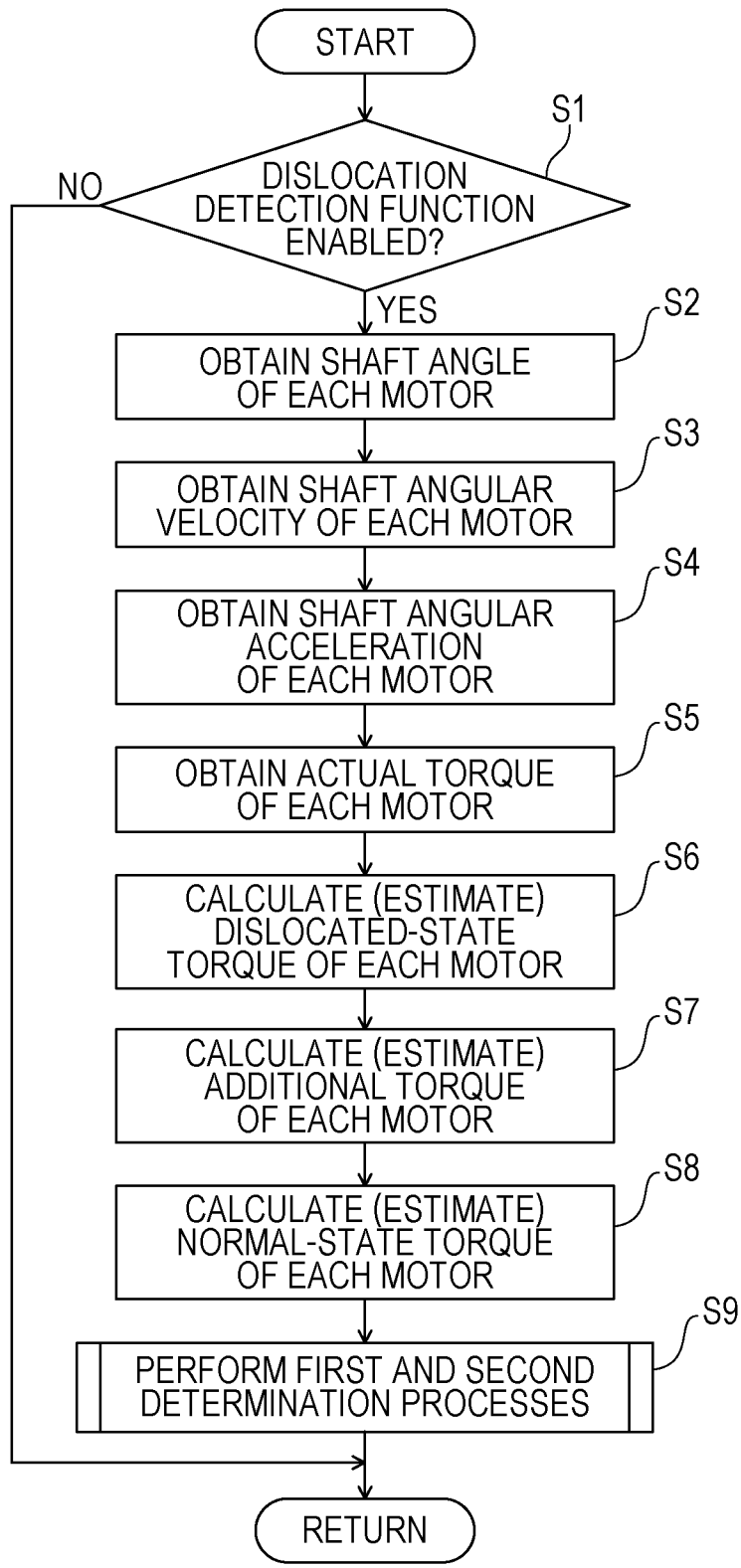
FIG. 3 is a flowchart illustrating a dislocation detection process performed by the parallel link robot according to the embodiment.

Next, referring to FIG. 3, a dislocation detection process performed by the robot controller 2 will be described. The robot controller 2 repeatedly performs the dislocation detection process after step S2 of FIG. 3 with a predetermined frequency (for example, once in several milliseconds to several tens of milliseconds). This frequency can be set as an updatable parameter in a non-volatile memory (not shown) of the robot controller 2.

First, in step S1, the robot controller 2 determines whether or not the dislocation detection function is enabled. If the dislocation detection function has been enabled by a user, the robot controller 2 obtains the shaft angle of each of the three servo motors 12 in step S2. The shaft angle of each of the three servo motors 12 is the rotation angle of the first link 131 of a corresponding one of the arms 13 in a vertical plane. The robot controller 2 obtains the shaft angle of each servo motor 12 on the basis of a detection result obtained by an encoder (not shown) included in each servo motor 12. In step S3, the robot controller 2 obtains the shaft angular velocity of each servo motor 12. The robot controller 2 obtains the shaft angular velocity by calculating the first derivative of the shaft angle, which has been obtained in step S2, with respect to time. In step S4, the robot controller 2 obtains the shaft angular acceleration of each servo motor 12. The robot controller 2 obtains the shaft angular acceleration by calculating the second derivative of the shaft angle, which has been obtained in step S2, with respect to time.

Next, in step S5, the robot controller 2 obtains an actual torque $\tau J$ of each servo motor 12. The actual torque $\tau J$ changes as a load applied to the servo motor 12 increases and decreases. The robot controller 2 obtains the actual torque $\tau J$ of each servo motor 12 on the basis of a position command and a velocity command that are given to each servo motor 12. That is, the robot controller 2 obtains the actual torque $\tau J$ on the basis of command values given to each servo motor 12. It is preferable that the shaft angular acceleration of each servo motor 12, which is obtained in step S4, and the actual torque $\tau J$ of each servo motor 12, which is obtained in step S5, be passed through a first order lag filter in order to filter out noise. The actual torque $\tau J$ is an example of an "actual driving force" according to the present disclosure. Note that it is not necessary to perform steps S2 to S5 for the purpose of dislocation detection only. In other words, the shaft angle, the shaft angular velocity, and the shaft angular acceleration of each servo motor 12 that are detected for motion control of the robot body 1 and torque command values for motion control may be used in the dislocation detection process.

In step S6, the robot controller 2 calculates (estimates) a dislocated-state torque $\tau D$ of each servo motor 12 by using equation (1) shown below. The dislocated-state torque $\tau D$ of the servo motor 12 is a torque that is applied to the servo motor 12 when a joint (at least one of the first and second joints 133 and 134) of a corresponding one of the arms 13 is dislocated. If the first joint 133 is dislocated or if the second link 132 drops off as illustrated in FIG. 5, only the mass of the first link 131 is applied to the servo motor 12. As illustrated in FIG. 4, if the second joint 134 of a predetermined arm 13 becomes dislocated, the head 14 becomes separated from the second link 132. In this case, it is assumed that the corresponding servo motor 12 is influenced by substantially only the first link 131, because the mass of the second link 132 is smaller than the mass of the first link 131 and the mass of the end effector 110 and therefore the mass of the second link 132 can be neglected. Therefore, in the present embodiment, the dislocated-state torque $\tau D$ is calculated (estimated) with consideration of only the influence of the first link 131.

Dislocated-State Torque $$\tau_{D1} = J_1 \ddot{\theta}_1 + D_1 \dot{\theta}_1 + C_1 \theta_1 \quad (1)$$

In equation (1), $\tau D1$ is the dislocated-state torque of a predetermined one of the servo motors 12 corresponding to a predetermined one of the three arms 13, J1 is the inertia of the first link 131 of the predetermined arm 13, D1 is a coefficient related to the movement speed of the first link 131 of the predetermined arm 13, C1 is a coefficient related to the gravity acting on the first link 131 of the predetermined arm 13, and $\theta 1$ is the shaft angle of the predetermined servo motor 12. The values of J1, D1 and C1 are specific to the robot body 1. For each of the servo motors 12 for driving the other two of the three arms 13, the dislocated-state torque $\tau D$ is calculated (estimated) in a similar way by using equation (1).

Next, in step S7, the robot controller 2 calculates (estimates) the additional torque $\tau F$ of each servo motor 12 by using equation (2) shown below. The additional torque $\tau F$ of the servo motor 12 is a torque due to a load applied to the first link 131 from the second link 132 when the arm 13 is in a normal state (a state in which a joint is not dislocated). The additional torque $\tau F$ includes torque components due to interference forces applied from the arms 13 other than the corresponding arm 13 and torque components that correspond to nonlinear terms. In the present embodiment, the mass of the second link 132 is neglected in the calculation of the additional torque $\tau F$, because the mass of the second link 132 is smaller than the mass of the first link 131 and the mass of the end effector 110. In other words, the additional torque $\tau F$ of the servo motor 12 is a torque including torque components for driving parts other than the arm 13, such as the head 14 and the end effector 110, when the arm 13 is in the normal state (a state in which a joint is not dislocated). The additional torque $\tau F$ of the servo motor 12 changes in accordance with the orientation of each of the three arms 13 and is influenced by the interference forces from the arms 13 other than the corresponding arm 13. The additional torque $\tau F$ is an example of a "predetermined driving force" according to the present disclosure.

Additional Torque $$\tau_{F1} = b_1 \ddot{\theta}_2 + c_1 \ddot{\theta}_3 + d_1 \dot{\theta}_1^2 + e_1 \dot{\theta}_2^2 + f_1 \dot{\theta}_3^2 + g_1 \dot{\theta}_1 \dot{\theta}_2 + h_1 \dot{\theta}_1 \dot{\theta}_3 + i_1 \dot{\theta}_2 \dot{\theta}_3 \quad (2)$$

In equation (2), $\tau F1$ is the additional torque of a predetermined one of the servo motors 12 corresponding to a predetermined one of the three arms 13; b1, c1, d1, e1, f1, g1, h1 and i1 are coefficients determined in accordance with the orientations of the three arms 13; $\theta 1$ is the shaft angle of the predetermined servo motor 12; and $\theta 2$ and $\theta 3$ are the shaft angles of two servo motors 12 other than the predetermined servo motor 12. The terms of equation (2) having the coefficients b1 and c1 represent torques due to the interference forces from the arms 13 other than the predetermined arm 13. The terms having the coefficients d1, e1, f1, g1, h1, and i1 are nonlinear terms.

The coefficients b1, c1, d1, e1, f1, g1, h1, and i1 of equation (2) can be calculated beforehand by solving the equation of motion of the robot body 1. However, the details of the method of this calculation are omitted here. The coefficient c1 in equation (2) is different from C1 in equation (1). As in step S6, the additional torque $\tau F$ of the servo motor 12 that drives each of the other two arms 13 is calculated (estimated) in a similar way by using equation (2).

In step S8, the robot controller 2 calculates (estimates) the normal-state torque $\tau S$ of each servo motor 12 by using equation (3) shown below. The normal-state torque $\tau S$ of the servo motor 12 is a torque applied to the corresponding servo motor 12 when the arm 13 is in a normal state (a state in which a joint is not dislocated). That is, a predetermined normal-state torque $\tau S$ includes a torque component for driving the predetermined arm 13 and a torque component for driving parts other than the predetermined arm 13 such as the head 14 and the end effector 110. In the present embodiment, the torque component for driving the predetermined arm 13 is substantially the same as the torque component for driving the first link 131, because the mass of the second link 132 is neglected as described above.

Normal-State Torque $$\tau_{S1} = \tau_{D1} + \tau_{F1} \quad (3)$$

In equation (3), $\tau S1$ is the normal-state torque of a predetermined one of the servo motors 12 corresponding to a predetermined one of the three arms 13, $\tau D1$ is the dislocated-state torque of the predetermined servo motor 12, and $\tau F1$ is the additional torque of the predetermined servo motor 12. As in steps S6 and S7, the normal-state torque $\tau S$ of the servo motor 12 of each of the other two arms 13 is calculated (estimated) in a similar way by using equation (3).

Subsequently, in step S9, the robot controller 2 concurrently performs the first and second determination processes. The robot controller 2 repeatedly performs the processing of steps S2 to S9 at the predetermined frequency described above. In step S9, the first and second determination processes are performed for each of the servo motors 12 for driving the three arms 13.

Next, referring to FIG. 6, the first determination process will be described. First, in step S911, the robot controller 2 determines whether or not the additional torque τF of each servo motor 12, which has been calculated (estimated) in step S7 as described above, is equal to or larger than a threshold τa. The threshold τa is an example of a "second threshold" according to the present disclosure. The threshold τa can be set as an updatable parameter in a non-volatile memory (not shown) of the robot controller 2. If the additional torque τF is equal to or larger than the threshold τa, in step S912, the robot controller 2 calculates, for each servo motor 12, the absolute value of the difference between the actual torque τJ obtained in step S5 and the dislocated-state torque τD calculated (estimated) in step S6. In step S913, the robot controller 2 determines, for each servo motor 12, whether or not the absolute value of the difference between the actual torque τJ and the dislocated-state torque τD is equal to or smaller than a threshold τb. The threshold τb is an example of a "first threshold" according to the present disclosure. The threshold τb can be set as an updatable parameter in a non-volatile memory (not shown) of the robot controller 2. If, for at least one of the servo motors 12, the absolute value of the difference between the actual torque τJ and the dislocated-state torque τD is equal to or smaller than the threshold τb, the robot controller 2 increments the value of M by one (M=M+1) in step S914. M is an integer equal to or larger than zero.

In step S915, the robot controller 2 determines whether or not the count number M is equal to or larger than a predetermined number (for example, several times to several tens of times). The predetermined number can be set as an updatable parameter in a non-volatile memory (not shown) of the robot controller 2. That is, the robot controller 2 determines whether or not a state in which the additional torque τF is equal to or larger than the threshold τa and the absolute value of the difference between the actual torque τJ and the dislocated-state torque τD is equal to or smaller than the threshold τb has continued for a predetermined time. This predetermined time is in the range of several milliseconds to several hundreds of milliseconds if the robot controller 2 performs the dislocation detection process with a frequency of once in several milliseconds to several tens of milliseconds. The robot controller 2 determines whether or not the condition described above has been continuously satisfied for the predetermined time. If the count number M is smaller than the predetermined number, the robot controller 2 finishes the first determination process. If the count number M is equal to or larger than the predetermined number, in step S916, the robot controller 2 determines that a joint (at least one of the first joint 133 and the second joint 134) of the arm 13 is dislocated. Then, in step S917, the robot controller 2 stops the motion of the robot body 1 by stopping driving of the three servo motors 12, and performs error notification for notifying a user of dislocation of a joint. The error notification may be visually performed, for example, by using a display (not shown) of the robot controller 2 or auditorily performed by using a sound.

If it is determined in step S911 that the additional torque τF is not equal to or larger than the threshold τa (smaller than the threshold τa) or if it is determined in step S913 that the absolute value of the difference between the actual torque τJ and the dislocated-state torque τD is not equal to or smaller than the threshold τb (larger than the threshold τb), the robot controller 2 resets the counter (M=0) in step S918.

Next, referring to FIG. 7, the second determination process will be described. First, in step S921, the robot controller 2 calculates the absolute value of the difference between the actual torque τJ of each servo motor 12, which has been obtained in step S5, and the normal-state torque τS, which has been calculated (estimated) in step S8. In step S922, the robot controller 2 determines whether or not the absolute value of the difference between the actual torque τJ and the normal-state torque τS is equal to or larger than a threshold τc. The threshold τc is an example of a "third threshold" according to the present disclosure. The threshold τc can be set as an updatable parameter in a non-volatile memory (not shown) of the robot controller 2. If, for at least one of the servo motors 12, the absolute value of the difference between the actual torque τJ and the normal-state torque τS is equal to or larger than the threshold τc, the robot controller 2 increments the value of N by one (N=N+1) in step S923. N is an integer equal to or larger than zero.

In step S924, the robot controller 2 determines whether or not the count number N is equal to or larger than a predetermined number (for example, several times to several tens of times). The predetermined number can be set as an updatable parameter in a non-volatile memory (not shown) of the robot controller 2. That is, the robot controller 2 determines whether or not a state in which the absolute value of the difference between the actual torque τJ and the normal-state torque τS is equal to or larger than the threshold τc has continued for a predetermined time. This predetermined time is in the range of several milliseconds to several hundreds of milliseconds if the robot controller 2 performs the dislocation detection process with a frequency of once in several milliseconds to several tens of milliseconds. The robot controller 2 determines whether or not the condition described above has been continuously satisfied for the predetermined time. If the count number N is smaller than the predetermined number, the robot controller 2 finishes the second determination process. If the count number N is equal to or larger than the predetermined number, in step S925, the robot controller 2 determines that a joint (at least one of the first joint 133 and the second joint 134) of the arm 13 is dislocated. Then, in step S926, as in step S917 described above, the robot controller 2 stops the motion of the robot body 1 by stopping driving of the three servo motors 12, and performs error notification for notifying a user of dislocation of a joint.

If it is determined in step S922 that the absolute value of the difference between the actual torque τJ and the normal-state torque τS is not equal to or larger than the threshold τc (smaller than the threshold τc), the robot controller 2 resets the counter (N=0) in step S927. In the present embodiment, the first and second determination processes are concurrently performed as described above, and if at least one of the conditions of the first and second determination processes is satisfied, the robot controller 2 determines that a joint (at least one of the first joint 133 and the second joint 134) of the arm 13 is dislocated, and stops the motion of the robot body 1.

In the present embodiment, as described above, the robot controller 2 determines whether or not a joint (at least one of the first joint 133 and the second joint 134) of the arm 13 is dislocated on the basis of the torques of the three servo motors 12. Thus, whether or not a joint is dislocated can be determined on the basis of the torque of each servo motor 12 without disposing an additional dedicated component for dislocation detection, such as a conductor, in the joint. Therefore, dislocation of a joint of the arm 13 can be detected while restraining the structure of the joint from becoming complex. Moreover, by using the existing robot controller 2 is used for dislocation detection, it is not necessary to dispose an additional dedicated component such as a conductor for dislocation detection, and thereby increase in the number of components can be restrained.

In the present embodiment, as described above, the robot controller 2 estimates the torques (the dislocated-state torque τD and the normal-state torque τS) of the corresponding servo motor 12 when the predetermined arm 13 is in the dislocated state and in the normal state. The robot controller 2 determines whether or not a joint (at least one of the first joint 133 and the second joint 134) of the predetermined arm 13 is dislocated on the basis of the estimated torques of the predetermined servo motor 12 and the actual torque τJ of the predetermined servo motor 12. With such a configuration, whether or not a joint is dislocated can be determined by comparing the estimated torques (the dislocated-state torque τD and the normal-state torque τS) with the actual torque τJ, and thus dislocation of a joint can be easily detected.

In the present embodiment, as described above, the robot controller 2 determines that a joint (at least one of the first joint 133 and the second joint 134) of the predetermined arm 13 is dislocated if the difference between the dislocated-state torque τD of the predetermined servo motor 12 and the actual torque τJ of the predetermined servo motor 12 is equal to or smaller than the threshold τb. With such a configuration, dislocation of a joint can be reliably detected when the actual torque τJ approaches the estimated dislocated-state torque τD.

In the present embodiment, as described above, the robot controller 2 determines that a joint (at least one of the first joint 133 and the second joint 134) of the predetermined arm 13 is dislocated if the additional torque τF of the predetermined servo motor 12 is equal to or larger than the threshold τa and the difference between the dislocated-state torque τD of the predetermined servo motor 12 and the actual torque τJ of the predetermined servo motor 12 is equal to or smaller than the threshold τb. With such a configuration, occurrence of false detection in that it is determined that a joint is dislocated when the joint is not actually dislocated (is in a normal state) can be restrained. Such false detection may occur when a torque applied to the servo motor 12 decreases in order to drive parts other than the predetermined arm 13 (such as the head 14 and the end effector 110) and thereby (i.e. as a result of the decrease of the additional torque τF) the difference between the dislocated-state torque τD and the actual torque τJ decreases. As a result, dislocation of a joint can be more accurately detected.

In the present embodiment, as described above, the robot controller 2 determines that a joint (at least one of the first joint 133 and the second joint 134) of the predetermined arm 13 is dislocated if a state in which the difference between the dislocated-state torque τD of the predetermined servo motor 12 and the actual torque τJ of the predetermined servo motor 12 is equal to or smaller than the threshold τb has continued for a predetermined time. With such a configuration, occurrence of erroneous determination in that it is determined that a joint is dislocated if a state in which the difference between the dislocated-state torque τD and the actual torque τJ is equal to or smaller than the threshold τb has occurred for only a short time can be restrained. As a result, occurrence of erroneous detection of dislocation of a joint can be restrained. Also for this reason, dislocation of a joint can be more accurately detected.

In the present embodiment, as described above, the robot controller 2 determines that a joint (at least one of the first joint 133 and the second joint 134) of the predetermined arm 13 is dislocated if the difference between the normal-state torque τS and the actual torque τJ of the predetermined servo motor 12 is equal to or larger than the threshold τc. With such a configuration, dislocation of a joint can be reliably detected when the actual torque τJ deviates from the estimated normal-state torque τS.

In the present embodiment, as described above, the robot controller 2 determines that a joint (at least one of the first joint 133 and the second joint 134) of the predetermined arm 13 is dislocated if a state in which the difference between the normal-state torque τS and the actual torque τJ of the predetermined servo motor 12 is equal to or larger than the threshold τc has continued for the? predetermined time. With such a configuration, occurrence of erroneous determination in that it is determined that a joint is dislocated if a state in which the difference between the normal-state torque τS and the actual torque τJ is equal to or larger than the threshold τb has occurred for only a short time can be restrained. As a result, occurrence of false detection of dislocation of a joint can be restrained.

In the present embodiment, as described above, the robot controller 2 determines that a joint (at least one of the first joint 133 and the second joint 134) of the predetermined arm 13 is dislocated if at least one of the following conditions is satisfied: one condition is that the difference between the dislocated-state torque τD and the actual torque τJ of the predetermined servo motor 12 is equal to or smaller than the threshold τb, and the other condition is that the difference between the normal-state torque τS and the actual torque τJ of the predetermined servo motor 12 is equal to or larger than the threshold τc. With such a configuration, whether or not a joint is dislocated can be reliably detected by using different criteria one of which is based on the difference between the dislocated-state torque τD and the actual torque τJ and the other of which is based on the difference between the normal-state torque τS and the actual torque τJ.

In the present embodiment, as described above, the robot controller 2 performs control so as to stop the three servo motors 12 if it is determined that a joint (at least one of the first joint 133 and the second joint 134) of the predetermined arm 13 is dislocated on the basis of the estimated torques (the dislocated-state torque τD and the normal-state torque τS) and the actual torque τJ of the predetermined servo motor 12. With such a configuration, occurrence of a trouble in that the arm 13 is continuously driven by the servo motor 12 even though the parallel link robot 100 is unable to perform a desired motion due to dislocation of a joint can be restrained. As a result, the arm 13 and the end effector 110 and the like, which are supported by the arm 13, are restrained from being moved to unintended positions.

Figure 6:
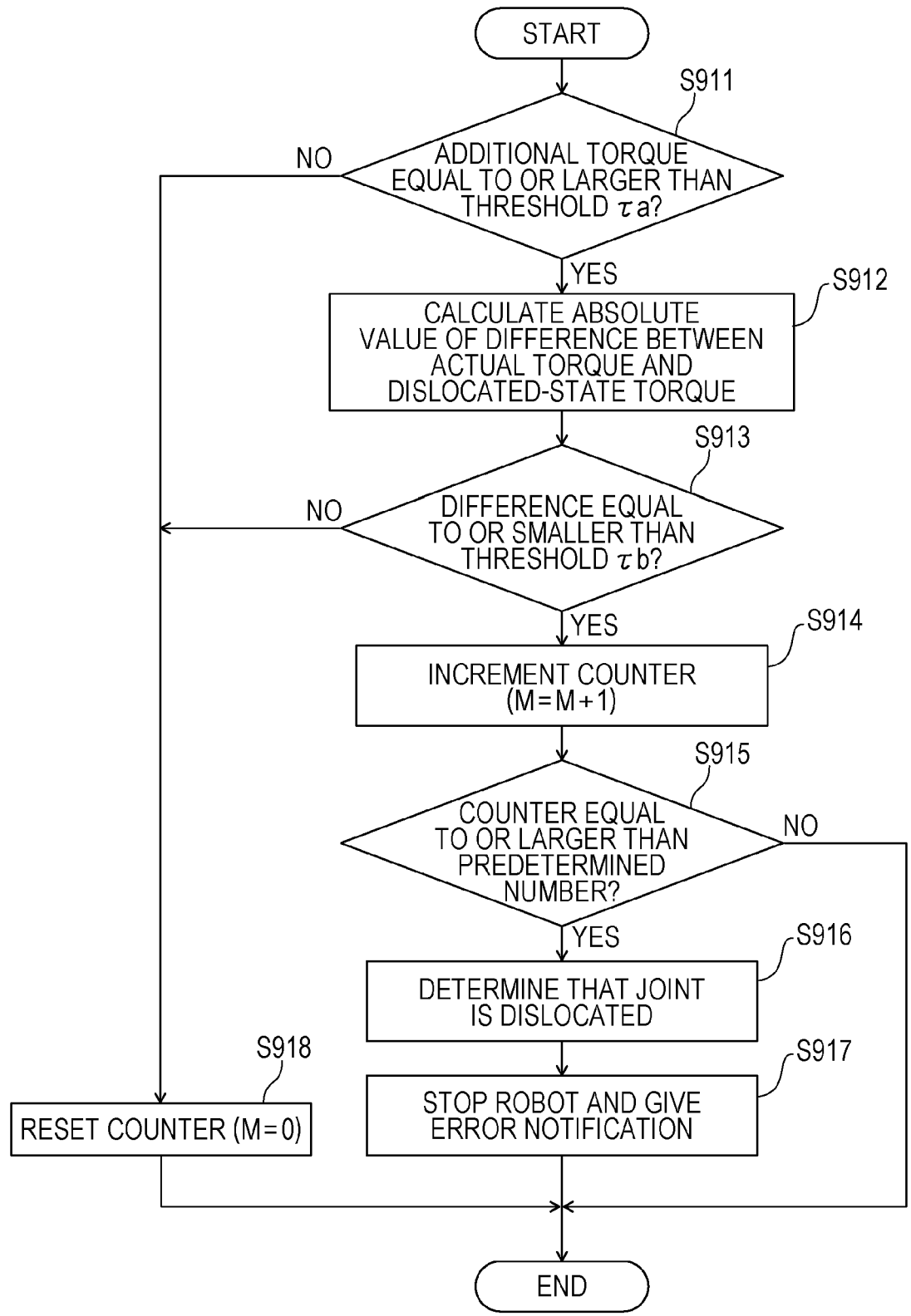
FIG. 6 is a flowchart illustrating a first determination process performed by the parallel link robot according to the embodiment.
Figure 7:
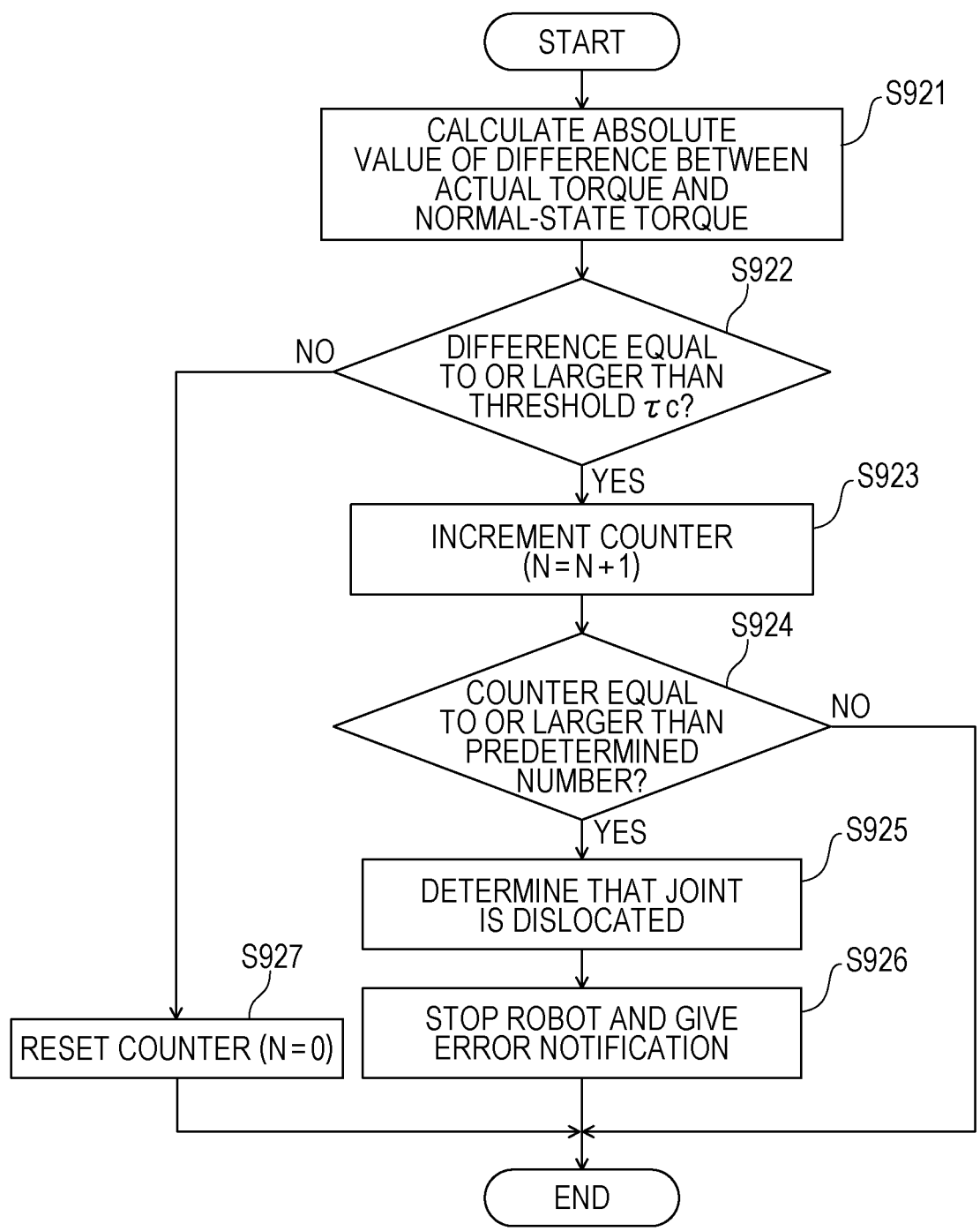
FIG. 7 is a flowchart illustrating a second determination process performed by the parallel link robot according to the embodiment.
Figure 8:
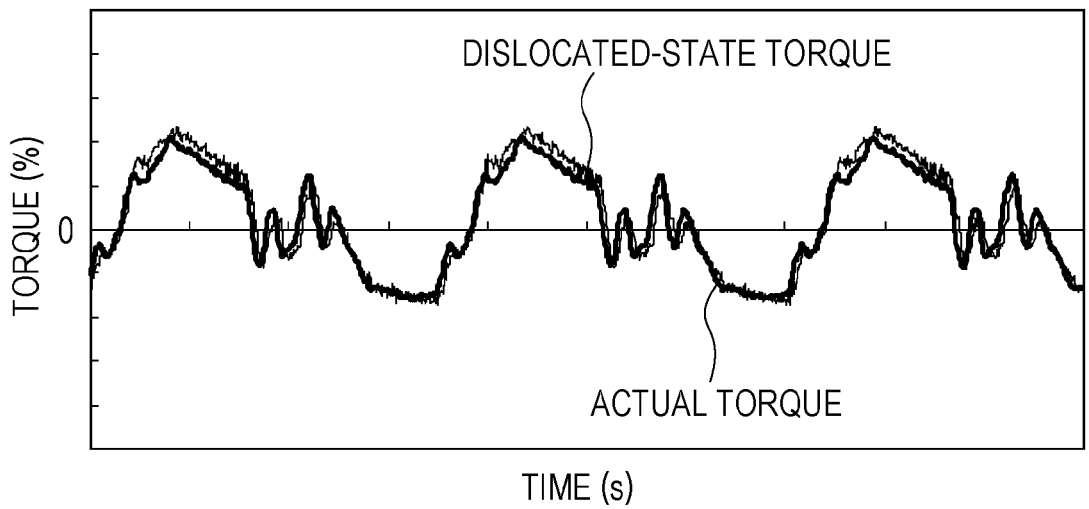
FIG. 8 is a graph that compares the actual torque with the dislocated-state torque when a joint of the parallel link robot according to the embodiment is dislocated.
Figure 9:
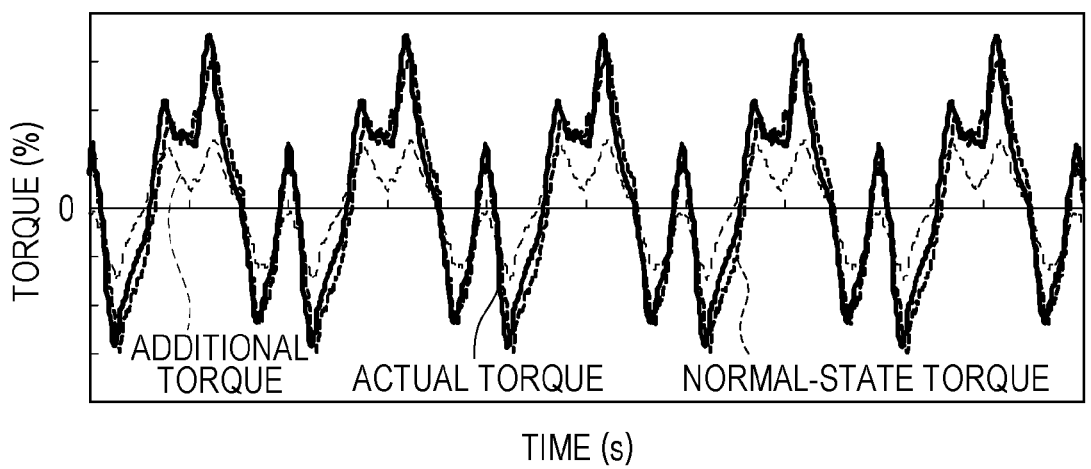
FIG. 9 is a graph that compares the actual torque with the additional torque when the parallel link robot according to the embodiment is in a normal state.
Figure 10:
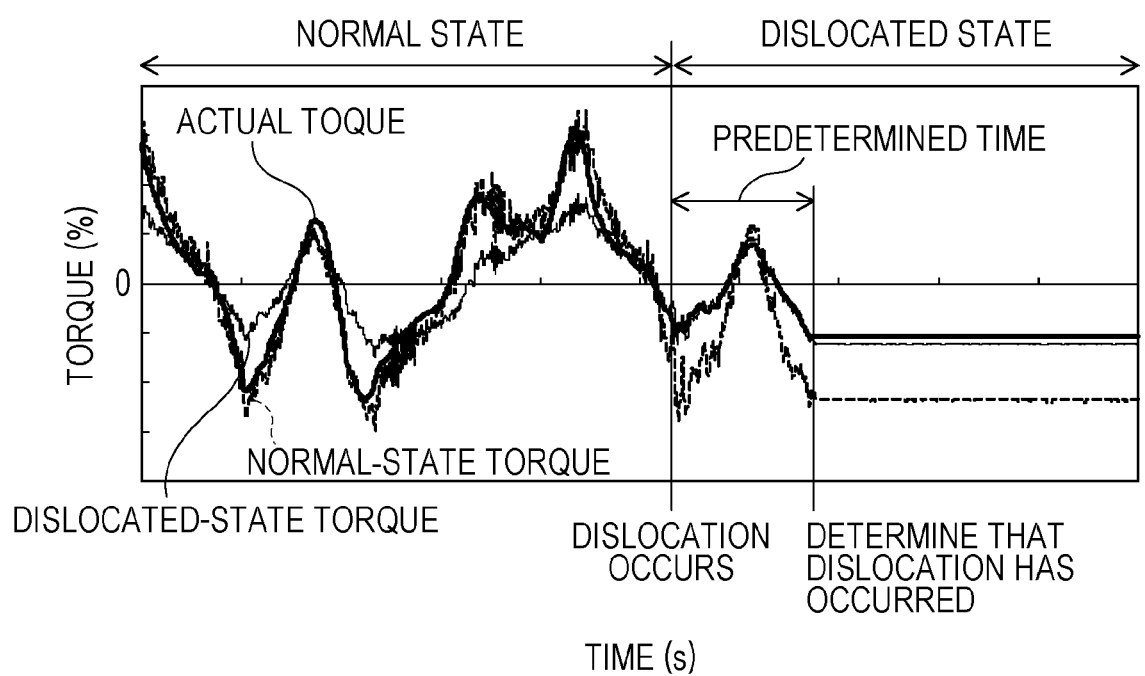
FIG. 10 is a graph that compares the actual torque, the dislocated-state torque, and the normal-state torque with one another when dislocation of a joint of the parallel link robot according to the embodiment occurs.

The inventor carried out an experiment for examining the precision of the dislocation detections of the first determination process (see FIG. 6) and the second determination process (see FIG. 7). Referring to FIGS. 8 to 10, the precision of dislocation detection performed for the predetermined arm 13 through the first determination process (see FIG. 6) and the second determination process (see FIG. 7) will be described. In FIGS. 8 to 10, the vertical axis represents the ratio (%) of torques of the servo motor 12 to the rated torque of the servo motor 12 and the horizontal axis represents time (second).

First, as illustrated in FIG. 8, when a joint of the arm 13 was dislocated, the actual torque τJ and the dislocated-state torque τD calculated (estimated) by using equation (1) substantially coincided with each other and changed in substantially the same manner, and therefore it was confirmed that the dislocated-state torque τD can be calculated (estimated) with high precision by using equation (1).

As illustrated in FIG. 9, when a joint of the arm 13 was not dislocated (was in a normal state), the actual torque τJ and the normal-state torque τS calculated by using equation (3) substantially coincided with each other and changed in substantially the same manner, and therefore it was confirmed that the normal-state torque τS can be calculated (estimated) with high precision by using equation (3). The additional torque τF calculated (estimated) by using equation (2) changed in substantially the same manner as the actual torque τJ but in a range smaller than that of the actual torque τJ.

As illustrated in FIG. 10, during the normal state, the actual torque τJ and the normal-state torque τS calculated (estimated) by using equation (3) substantially coincided with each other and changed in substantially the same manner as in the case of FIG. 9, and the actual torque τJ and the dislocated-state torque τD calculated (estimated) by using equation (1) changed while being deviated from each other. In contrast, after dislocation had occurred (during the dislocated state), the actual torque τJ and the dislocated-state torque τD calculated (estimated) by using equation (1) substantially coincided with each other (in a state in which the absolute value of the difference between the actual torque τJ and the dislocated-state torque τD is equal to or smaller than the threshold τb in the first determination process) and changed in the same manner as in the case of FIG. 8, and the actual torque τJ and the normal-state torque τS calculated (estimated) by using the equation (3) changed while being deviated from each other (in a state in which the absolute value of the difference between the actual torque τJ and the normal-state torque τS is equal to or larger than the threshold τc in the second determination process). Then, after dislocation of a joint had occurred and the dislocated state had continued for a predetermined time, the robot controller 2 determined that the joint was dislocated and stopped driving of the servo motor 12.

It should be understood that the embodiment disclosed herein is exemplary in all respects and does not limit the present disclosure. The technical scope of the present disclosure is not represented by the description of the embodiment, and includes all modifications within the scope of the claims and the equivalents thereof.

For example, in the embodiment, a parallel link robot including a robot body and a robot controller is described as an example of a parallel link robot according to the present disclosure. However, the present disclosure is not limited thereto. In the present disclosure, the parallel link robot need not include a robot controller. In this case, the parallel link robot and the robot controller are included in a parallel link robot system according to the present disclosure.

In the embodiment, a parallel link robot including three arms is described as an example of a parallel link robot according to the present disclosure. However, the present disclosure is not limited thereto. In the present disclosure, a parallel link robot may include two, four, or more than four arms.

In the embodiment, dislocation of a joint is detected on the basis of the estimated torque (driving force) of the servo motor (drive source) and the actual torque (actual driving force) of the servo motor. However, the present disclosure is not limited thereto. In the present disclosure, dislocation of a joint may be detected on the basis of only one of the actual driving force and the estimated driving force of the servo motor, as long as the detection is performed on the basis of the driving force of the serve motor.

In the embodiment, a servo motor is described as an example of a drive source according to the present disclosure, and a torque is described as an example of a driving force according to the present disclosure. However, the present disclosure is not limited thereto. In the present disclosure, a drive source need not be a servo motor, and a driving force need not be a torque.

In the embodiment, dislocation of a joint is detected on the basis of the torques (driving forces) of all servo motors (drive sources). However, the present disclosure is not limited thereto. In the present disclosure, dislocation of a joint may be detected on the basis of the driving force of at least one drive source.

In the embodiment, dislocation of a joint is detected through the first determination process illustrated in FIG. 6 and the second determination process illustrated in FIG. 7. However, the present disclosure is not limited thereto. In the present disclosure, dislocation of a joint may be detected through only one of the first determination process and the second determination process.

Figure 11:
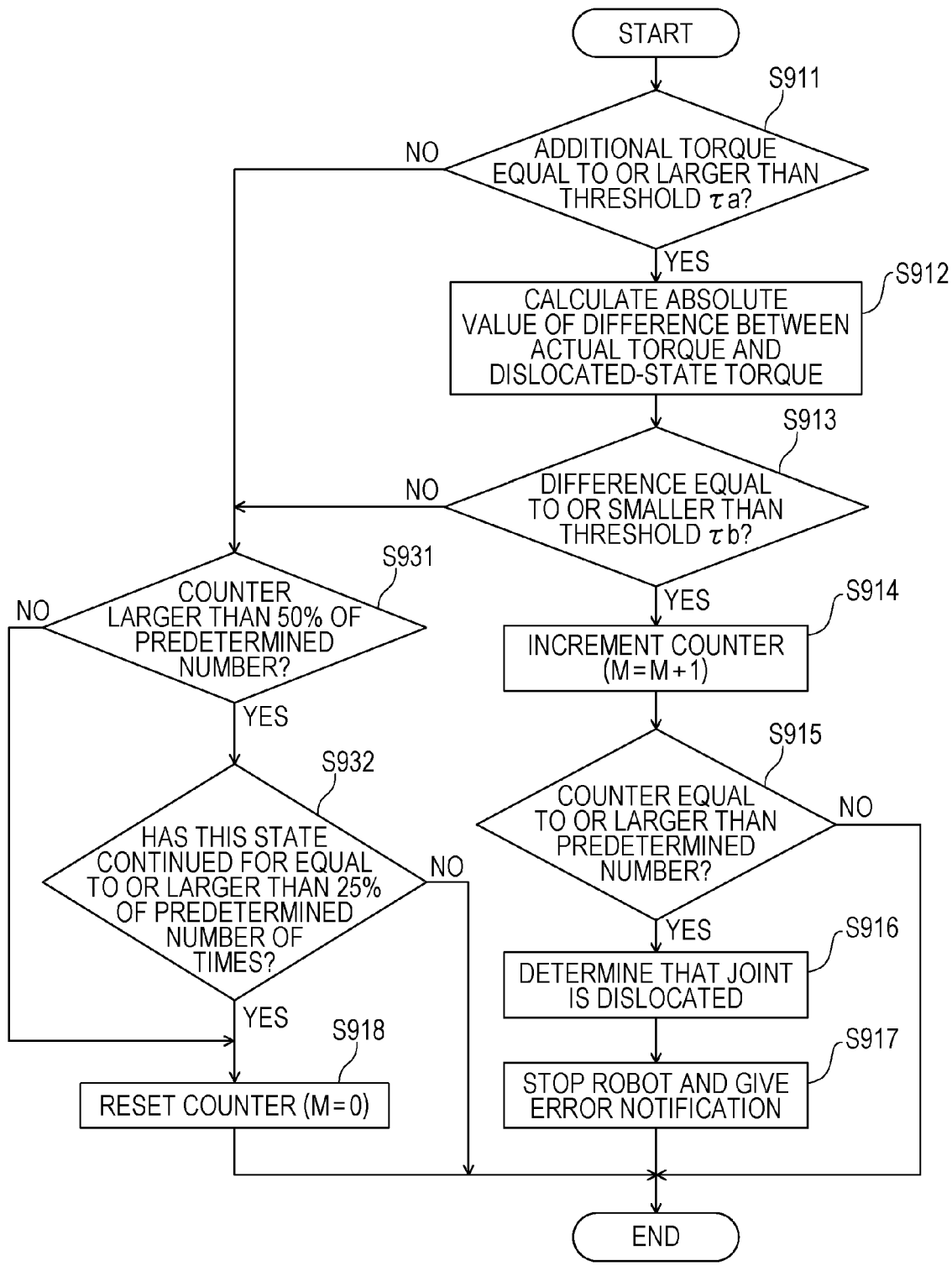
FIG. 11 is a flowchart illustrating a first determination process performed by the parallel link robot according to a modification of the embodiment.

In the embodiment, in the first determination process illustrated in FIG. 6, the counter is reset (M=0) if the additional torque τF is not equal to or larger than the threshold τa in step S911 or if the absolute value of the difference between the actual torque τJ and the dislocated-state torque τD is not equal to or smaller than the threshold τb in step S913. However, the present disclosure is not limited thereto. In the present disclosure, as illustrated in FIG. 11, the robot controller 2 may determine whether or not the counter is larger than 50% of a predetermined number in step S931 if the additional torque τF is not equal to or larger than the threshold τa in step S911 or if the absolute value of the difference between the actual torque τJ and the dislocated-state torque τD is not equal to or smaller than the threshold τb in step S913. In this case, if the counter is not larger than 50% of the predetermined number, the counter is reset (M=0) in step S918.

If the counter is larger than 50% of the predetermined number, the robot controller 2 determines whether or not this state has continued for equal to or larger than 25% of the predetermined number of times in step S932. That is, the robot controller 2 determines whether or not a state in which the additional torque τF is not equal to or larger than the threshold τa or a state in which the absolute value of the difference between the actual torque τJ and the dislocated-state torque τD is not equal to or smaller than the threshold τb has continued equal to or larger than 25% of the predetermined number of times. If one of these states has continued equal to or larger than 25% of the predetermined number of times, the counter is reset (M=0) in step S918. If none of these states has continued equal to or larger than 25% (has continued smaller than 25%) of the predetermined number of times, the count number is not reset and the first determination process is finished. Thus, the counter is restrained from being reset if a state in which the additional torque τF is not equal to or larger than the threshold τa or a state in which the absolute value of the difference between the actual torque τJ and the dislocated-state torque τD is not equal to or smaller than the threshold τb has continued for only a short time although a state in which the additional torque τF is equal to or larger than the threshold τa and the absolute value of the difference between the actual torque τJ and the dislocated-state torque τD is equal to or smaller than the threshold τb has continued for longer a certain part of the predetermined time. As a result, the precision to dislocation detection can be increased.

Figure 12:
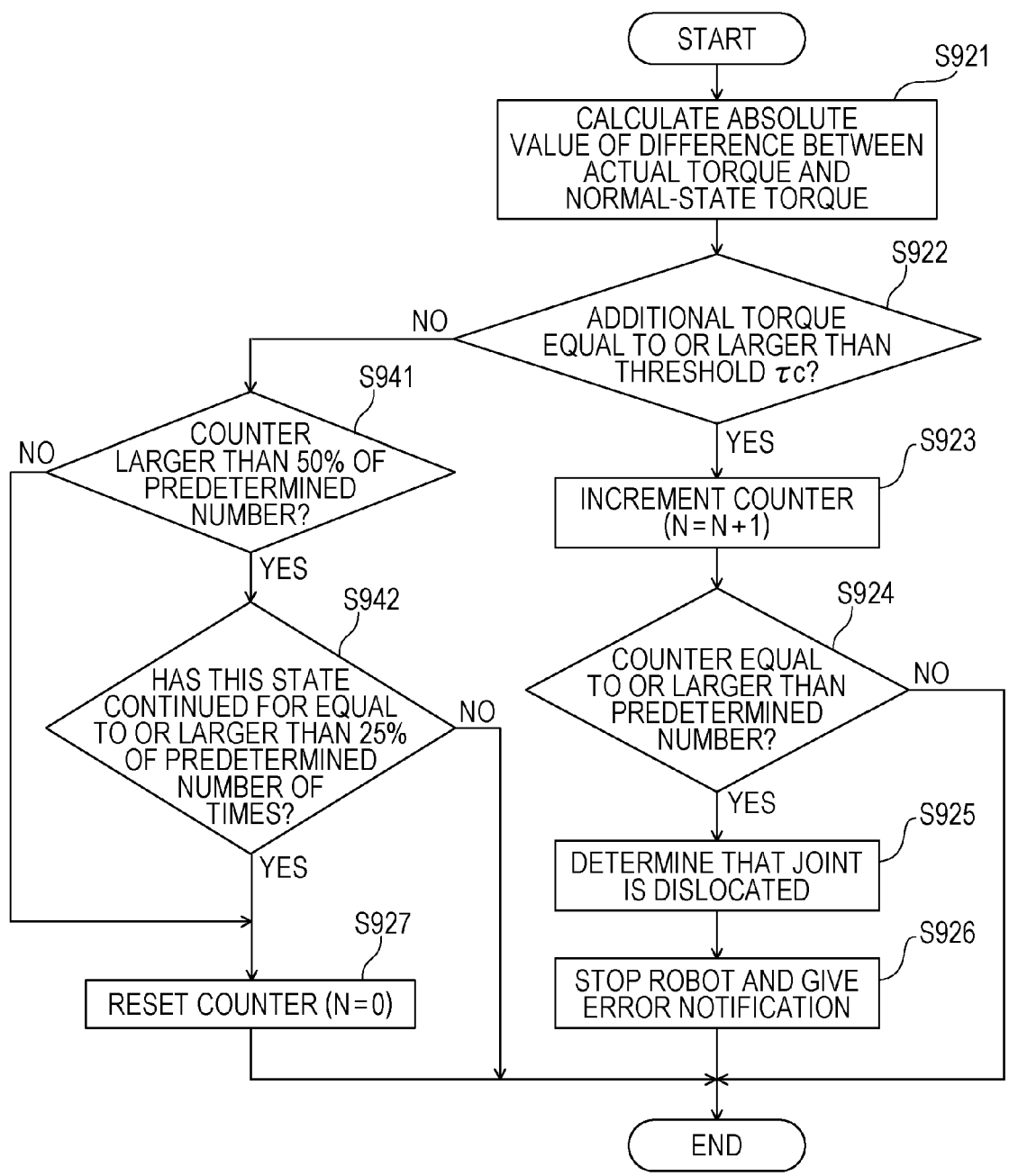
FIG. 12 is a flowchart illustrating a second determination process performed by the parallel link robot according to the modification of the embodiment.

In the embodiment, in the second determination process illustrated in FIG. 7, the counter is reset (N=0) if the absolute value of the difference between the actual torque τJ and the normal-state torque τS is not equal to or larger than the threshold τc in step S922. However, the present disclosure is not limited thereto. In the present disclosure, as illustrated in FIG. 12, as in the first determination process, if the absolute value of the difference between the actual torque τJ and the normal-state torque τS is not equal to or larger than the threshold τc in step S922, the robot controller 2 may determine whether or not the counter is larger than 50% of the predetermined number in step S941. If the counter is not larger than the predetermined number, the counter is reset (N=0) in step S927.

If the counter is larger than 50% of the predetermined number, the robot controller 2 determines whether or not the present state has continued for equal to or larger than 25% the predetermined number of times in step S942. That is, the robot controller 2 determines whether or not a state in which the absolute value of the difference between the actual torque τJ and the normal-state torque τS is not equal to or larger than the threshold τc has continued for equal to or larger than 25% of the predetermined number of times. If the state has continued for equal to or larger than 25% of the predetermined number, the counter is reset (N=0) in step S927. If the state has not continued for equal to or larger than 25% of the predetermined number of times (continued for smaller than 25%), the second determination process is finished without resetting the counter. Thus, the counter is restrained from being reset if a state in which the absolute value of the difference between the actual torque τJ an the normal-state torque τS is not equal to or larger than the threshold τc has continued for only a short time although a state in which the absolute value of the difference between the actual torque τJ and the normal-state torque τS is equal to or larger than the threshold τc has continued for equal to or larger than the? predetermined time. As a result, the accuracy to dislocation detection can be increased.

In the embodiment, for convenience of description, the processes performed by the robot controller, which corresponds to a dislocation detection portion according to the present disclosure, are described by using flaw-driven flowcharts that sequentially describes the flow of the processes. However, the present disclosure is not limited thereto. In the present disclosure, the processes performed by the dislocation detector may be event-driven processes in which the flows of the processes are determined by events. In this case, the processes may be entirely event-driven or may be combinations of event-driven and flow-driven.

It should be understood by those skilled in the art that various modifications, combinations, sub-combinations and alterations may occur depending on design requirements and other factors insofar as they are within the scope of the appended claims or the equivalents thereof.

What is claimed is:

1. A parallel link robot comprising:
a base;
a plurality of drive sources disposed in the base;
a plurality of arms that each includes a link including a joint, each of the plurality of arms being driven by a corresponding one of the plurality of drive sources; and
a dislocation detector that determines whether or not any of the joints of the arms is dislocated on the basis of a driving force of at least one of the plurality of drive sources,
wherein the dislocation detector estimates a driving force of a predetermined one of the drive sources corresponding to a predetermined one of the arms in at least one of a dislocated state and a normal state, the dislocated state being a state in which the joint of the predetermined arm is dislocated, the normal state being a state in which the joint of the predetermined arm is normal, and the dislocation detector determines whether or not the joint of the predetermined arm is dislocated on the basis of the estimated driving force of the predetermined drive source and an actual driving force of the predetermined drive source.

2. The parallel link robot according to claim 1,
wherein the dislocation detector estimates a dislocated-state driving force that is a driving force of the predetermined drive source when the joint of the predetermined arm is in the dislocated state, and the dislocation detector determines that the joint of the predetermined arm is dislocated if a difference between the dislocated-state driving force of the predetermined drive source and the actual driving force of the predetermined drive source is equal to or smaller than a first threshold.

3. The parallel link robot according to claim 2,
wherein the dislocation detector estimates a predetermined driving force including a driving force component for driving parts other than the predetermined arm, the predetermined driving force being included in the driving force of the predetermined drive source when the predetermined arm is in the normal state, and the dislocation detector determines that the joint of the predetermined arm is dislocated if the predetermined driving force is equal to or larger than a second threshold and the difference between the dislocated-state driving force of the predetermined drive source and the actual driving force of the predetermined drive source is equal to or smaller than the first threshold.

4. The parallel link robot according to claim 2,
wherein the dislocation detector determines that the joint of the predetermined arm is dislocated if a state in which the difference between the dislocated-state driving force of the predetermined drive source and the actual driving force of the predetermined drive source is equal to or smaller than the first threshold has continued for a predetermined time.

5. The parallel link robot according to claim 1,
wherein the dislocation detector estimates a normal-state driving force that is a driving force of the predetermined drive source when the joint of the predetermined arm is in the normal state, and the dislocation detector determines that the joint of the predetermined arm is dislocated if the difference between the normal-state driving force of the predetermined drive source and the actual driving force of the predetermined drive source is equal to or larger than a third threshold.

6. The parallel link robot according to claim 5,
wherein the dislocation detector determines that the joint of the predetermined arm is dislocated if a state in which the difference between the normal-state driving force of the predetermined drive source and the actual driving force of the predetermined drive source is equal to or larger than the third threshold has continued for a predetermined time.

7. The parallel link robot according to claim 1,
wherein the dislocation detector estimates a dislocated-state driving force that is a driving force of the predetermined drive source in the dislocated state in which the joint of the predetermined arm is in the dislocated state, the dislocation detector estimates a normal-state driving force that is a driving force of the predetermined drive source when the predetermined arm is in the normal state, and the dislocation detector determines that the joint of the predetermined arm is dislocated if at least one of the following conditions is satisfied, one condition being that the difference between the dislocated-state driving force of the predetermined drive source and the actual driving force of the predetermined drive source is equal to or smaller than a first threshold, and the other condition being that the difference between the normal-state driving force of the predetermined drive source and the actual driving force of the predetermined drive source is equal to or larger than a third threshold.

8. The parallel link robot according to claim 1,
wherein the dislocation detector performs control so as to stop the plurality of drive sources when the dislocation detector determines that the joint of the predetermined arm is dislocated on the basis of the estimated driving force of the predetermined drive source and the actual driving force of the predetermined drive source.

9. The parallel link robot according to claim 1,
wherein the drive source is a motor, and
wherein the driving force of the drive source is a torque of the motor.

10. A parallel link robot system comprising:
a parallel link robot including
   a base,
   a plurality of drive sources disposed in the base,
   a plurality of arms that each includes a link including a joint, each of the plurality of arms being driven by a corresponding one of the plurality of drive sources; and
a robot controller that controls motion of the parallel link robot,
wherein the robot controller determines whether or not any of the joints of the arms is dislocated on the basis of a driving force of at least one of the plurality of drive sources, and
wherein the dislocation detector estimates a driving force of a predetermined one of the drive sources corresponding to a predetermined one of the arms in at least one of a dislocated state and a normal state, the dislocated state being a state in which the joint of the predetermined arm is dislocated, the normal state being a state in which the joint of the predetermined arm is normal, and the dislocation detector determines whether or not the joint of the predetermined arm is dislocated on the basis of the estimated driving force of the predetermined drive source and an actual driving force of the predetermined drive source.

11. A method of controlling a parallel link robot including a base, a plurality of drive sources disposed in the base, and a plurality of arms that each includes a link including a joint, each of the plurality of arms being driven by a corresponding one of the plurality of drive sources, the method comprising:
determining, using a robot controller that controls motion of the parallel link robot, whether or not any of the joints of the arms is dislocated on the basis of a driving force of at least one of the plurality of drive sources,
wherein the determining whether or not the joint is dislocated includes
   estimating a driving force of a predetermined one of the drive sources corresponding to a predetermined one of the arms in at least one of a dislocated state and a normal state, the dislocated state being a state in which the joint of the predetermined arm is dislocated, the normal state being a state in which the joint of the predetermined arm is normal, and
   determining whether or not the joint of the predetermined arm is dislocated on the basis of the estimated driving force of the predetermined drive source and an actual driving force of the predetermined drive source.

12. The method of controlling the parallel link robot according to claim 11,
wherein the estimating the driving force of the predetermined drive source includes estimating a dislocated-state driving force that is a driving force of the predetermined drive source when the joint of the predetermined arm is in the dislocated state, and
wherein the determining whether or not the joint of the predetermined arm is dislocated includes determining that the joint of the predetermined arm is dislocated if a difference between the dislocated-state driving force of the predetermined drive source and the actual driving force of the predetermined drive source is equal to or smaller than a first threshold.

13. The method of controlling the parallel link robot according to claim 11,
wherein the estimating the predetermined drive source includes estimating a normal-state driving force that is a driving force of the predetermined drive source when the joint of the predetermined arm is in the normal state, and
wherein the determining whether the joint of the predetermined arm is dislocated includes determining that the joint of the predetermined arm is dislocated if the difference between the normal-state driving force of the predetermined drive source and the actual driving force of the predetermined drive source is equal to or larger than a third threshold.

14. The parallel link robot according to claim 1, wherein the dislocation detector is a robot controller.

* * * * *